United States Patent [19]

Cepkauskas

[11] Patent Number: 4,994,230
[45] Date of Patent: Feb. 19, 1991

[54] TEMPLATE METHOD FOR REPLACING A VESSEL IN A PIPE SYSTEM

[75] Inventor: Martin D. Cepkauskas, Eastham, Mass.

[73] Assignee: MK Ferguson Company, Cleveland, Ohio

[21] Appl. No.: 409,247

[22] Filed: Sep. 19, 1989

[51] Int. Cl.⁵ .............................................. G21C 21/00
[52] U.S. Cl. .................... 376/260; 376/258; 29/402.08; 122/DIG. 11
[58] Field of Search ............... 376/260, 245, 258, 461; 29/402.08, 157.4; 165/76; 122/DIG. 11; 432/3

[56] References Cited

U.S. PATENT DOCUMENTS

| | | | |
|---|---|---|---|
| 4,824,301 | 4/1989 | Martin | 82/113 |
| 4,847,038 | 7/1989 | Martin | 376/260 |
| 4,905,630 | 3/1990 | Weber | 122/DIG. 11 |

OTHER PUBLICATIONS

"Point Beach I Steam Generators Replaced Well Ahead of Schedule", Moers et al., NEI, 1/85, pp. 38–42.
"Replacing the Steam Generators at Surry Unit 2", Parrish, NEI, 5/80, pp. 21–28.

Primary Examiner—Daniel D. Wasil
Attorney, Agent, or Firm—Calfee, Halter & Griswold

[57] ABSTRACT

A method for replacing a vessel in a piping system utilizes a template to determine the relative spatial positions of the pipe connections to the vessel in the existing system. The template is then removed from the existing system and reassembled on the new vessel in a remote location to determine the relative spatial position of the new pipe connections to the new vessel to ascertain if alignment will exist between those new pipe connections and the existing pipes in the system. If not, the pipe connections on the new vessel are initially reworked in the remote location to achieve alignment within connection tolerances. The pipes are then cut at their respective connections to the old vessel, the old vessel is removed, the new vessel is put in place in the system and the cut ends of the pipes are connected to new connections on the new vessel to complete the installation of the new vessel in the piping system. This method, which may be utilized, for example, in replacing a steam generator in the primary system of a nuclear energy plant, allows most of the rework to be performed outside a radioactive environment and minimizes the amount of maintenance downtime for the plant.

8 Claims, 5 Drawing Sheets

TEMPLATE METHOD FOR REPLACING A VESSEL IN A PIPE SYSTEM

FIELD OF INVENTION

The present invention relates, in general, to a method for replacing an old vessel in a piping system with a new vessel and relates, in particular, to replacing steam generators in a nuclear energy plant in a manner reducing exposure to radiation and minimizing maintenance time.

BACKGROUND OF THE INVENTION

The primary system of a nuclear energy plant includes steam generators, a reactor vessel and core, pipes interconnecting the same and pumps to move water therethrough. Over years of use, the steam generator tubes may undergo degradation necessitating selective plugging of those tubes, which decreases the thermal and hydraulic performance of the steam generator. As the number of plugged tubes increases, the potential for unit derating and for additional licensing restrictions increases. Therefore, a decision must be made as to whether it is more economical to replace the steam generator or to continue with reduced efficiencies. The replacement of a steam generator theoretically restores the plant to its initial condition to allow performance at or near the intended specifications.

Several methods have been used to replace steam generators in nuclear energy plants. The first method included removing sections of inlet and outlet pipes in the primary system to allow the steam generator to be removed. The steam generator was then either replaced in whole or in part, and the new steam generator lowered back into place. The pipe sections were then reinstalled to complete the system. This method required at least two cuts to be made on each inlet and outlet pipe in a radioactive environment for steam generator removal. This method for reinstallation also required pipe realignment and reworking to be made in a radioactive environment followed by at least two welds on each pipe in that environment. This process required the entire plant to be shut down for a relatively extended period of time and resulted in the workers performing most of the replacement work in a radioactive environment.

Another replacement method, developed by the assignee of the present invention, utilized a template to assist in aligning the new vessel with the old pipes. In this method, the new steam generator had its support base and its inlet and outlet nozzles finish machined. The template was constructed on the new steam generator with rings centered on the inlet and outlet nozzle weld center lines and a base structure centered about the support base. A framework was then built to interconnect the rings and base structure to rigidly hold the same in their respective, centered locations. The relative positions of the nozzle weld center lines to the rings therearound was then measured and recorded.

The template was then removed from the new steam generator for placement on the cut ends of the existing primary system coolant pipes after the old steam generator had been disconnected and removed from the system. Measurements were then made of the cut end pipes of the primary system relative to the respective rings of the templates positioned therearound. These measurements were then compared to the measurements on the new steam generator to determine if alignment within weld tolerances existed between the new steam generator nozzles and the pipe ends of the primary system. If not, the cut ends of the primary system pipes were then reworked and/or remachined to achieve the required dimensional alignment to allow the new vessel to be lowered into the containment chamber and connected to the reworked pipe ends. This method was preferable to the earlier method since only one cut was made on each steam generator pipe in the primary system to reduce exposure to radioactivity and to reduce maintenance down time. However, the reworking of the primary system pipes was still being done in a radioactive environment on radioactive pipes, with this work being done while the plant was shut down.

SUMMARY OF THE PRESENT INVENTION

The principal object of the present invention is to replace a steam generator in a primary system of a nuclear energy plant with minimum exposure to radioactivity and with minimum plant down time. In order to accomplish this object, a template having pipe connection measurement rings and a base structure is initially assembled on the existing steam generator in the primary system in its operational configuration. The pipe connection measurement rings and base structure are centered around the existing nozzle/pipe connections and around the support base, respectively. These rings are rigidly held in their respective centered positions by a framework extending therebetween. This template is then removed from the radioactive environment and reassembled on the new steam generator.

If measurements between the nozzles on the new steam generator and the pipe connection measurement rings centered therearound comparatively indicate that alignment will not exist between the new nozzles and the existing pipes, the nozzles can be reworked and finish machined to obtain such alignment in a non-radioactive environment while the nuclear energy plant continues to operate. When the plant is then shut down, the old steam generator is removed, the new steam generator lowered into position and the welding of the pipes to the new nozzles completed.

Another object of the invention is to provide confirmation of alignment before lowering the new steam generator into place. To this end, the template can be lowered into registry with cut ends of the primary system pipes after the old steam generator has been removed to confirm alignment between the new nozzles and existing pipes. In addition, the respective planes of the new nozzle ends can be compared to corresponding planes of the cut pipe ends to confirm conformance therebetween within welding tolerances. If necessary, the pipe ends and/or nozzles can be reworked slightly to correct any misalignment or non-conformance.

These and other objects and advantages of the present invention will become apparent as the following description proceeds.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE PREFERRED EMBODIMENTS

Figure 1:
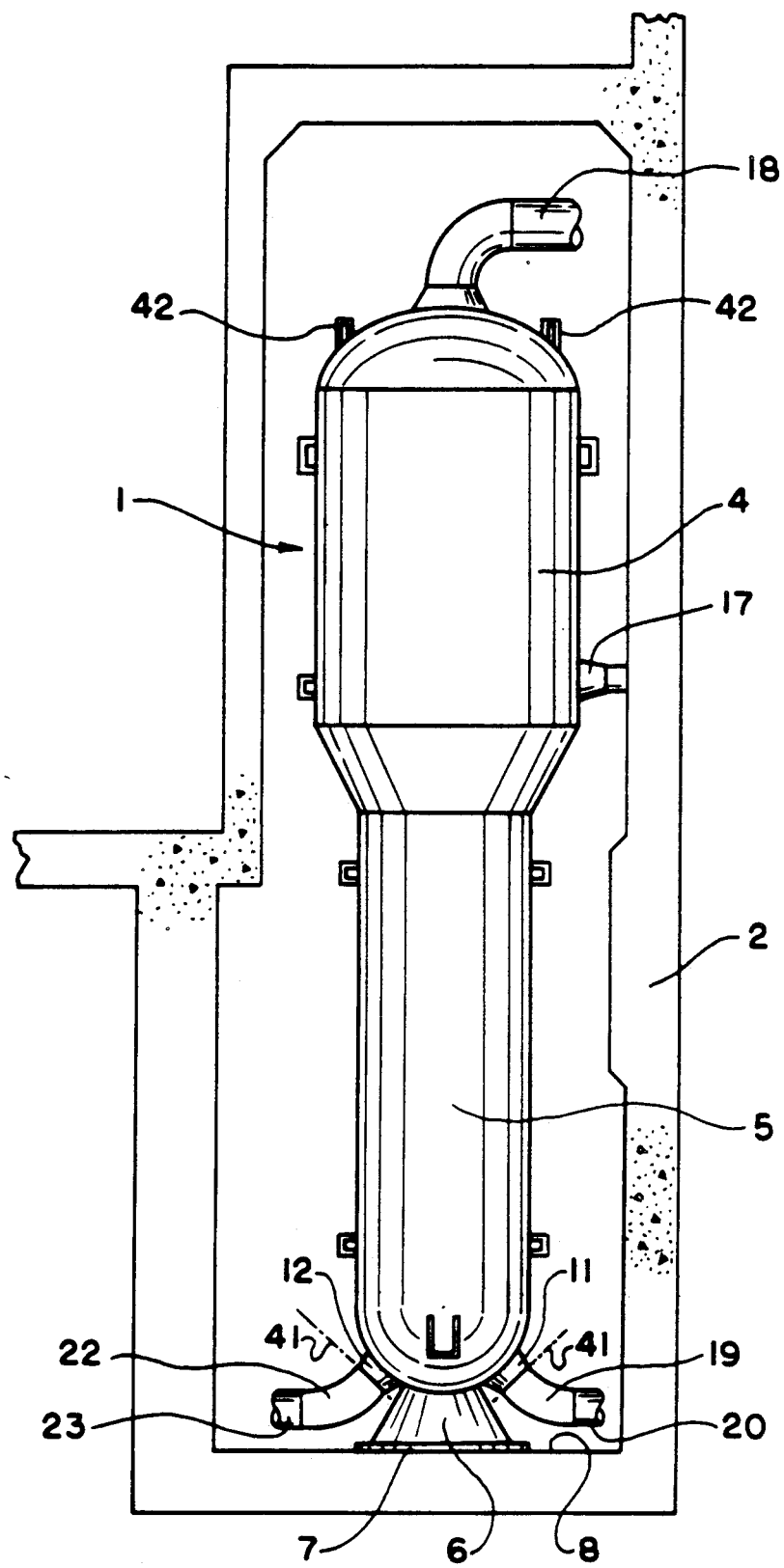
FIG. 1 is a front elevation of a steam generator positioned in a containment chamber of a nuclear energy plant.

Referring now in more detail to the drawings and initially to FIG. 1, a steam generator, indicated generally at 1, is contained within a concrete enclosure 2. The steam generator 1 includes an upper assembly 4 and a channel head/lower assembly 5. The steam generator 1 has a support base 6 extending downwardly therefrom. The bottom flange 7 on support base 6 is bolted to the floor 8 of the containment chamber to provide support for the steam generator 1.

The channel head/lower assembly has an inlet nozzle 10 (FIG. 3) and two outlet nozzles 11 and 12. A pipe 14 terminating in an elbow 15 is welded to the end of nozzle 10 as indicated at 16 to form the inlet hot leg. Hot water flows through pipe 14, elbow 15 and nozzle 10 into the tube bundle in the steam generator.

This tube bundle (not shown) is surrounded by a reservoir of water which enters the steam generator through feed water pipe 17 (FIG. 1). The heat exchange relationship between the switch back tubes in the tube bundle and the water reservoir results in the generation of steam in the reservoir through evaporation. The steam leaves the steam generator through the upper main steam pipe 18. The hot water flowing through the tube bundle splits and exits from the lower end of the steam generator through outlet nozzles 11 and 12. One "cold" outlet leg is formed by an innerconnected elbow 19 and pipe 20 being welded at the inner end of the elbow 19 to nozzle 11. The other cold exit leg is formed by an innerconnected elbow 22 and pipe 23 being welded at the inner end of the elbow 22 to nozzle 12.

As illustrated, the steam generator 1 is incorporated in the primary system of a nuclear energy plant. This primary system includes the steam generator 1, the reactor vessel and core (not shown), pipes interconnecting the same and the necessary pumps to move water through the pipes, the steam generator 1 and the reactor vessel and core. Over extended periods of time, the tubes in the heat exchange bundle of the steam generator 1 are subject to some degredation principally because of the water chemistry. This degradation, when it reaches advanced stages, may require certain tubes to be selectively plugged off to reduce the thermal and hydraulic performance of the steam generator. When the economics dictate, the steam generator 1 will be replaced in whole or in part to restore the plant performance to its original condition to meet or at least approach the original specifications.

The present invention utilizes a template to assist in replacing the steam generator in a method reducing exposure to radioactivity and minimizing down-time of the nuclear energy plant. This template is initially utilized on the old steam generator 1 in its operational configuration and with all pipes connected thereto as illustrated in FIG. 1.

Figure 2:
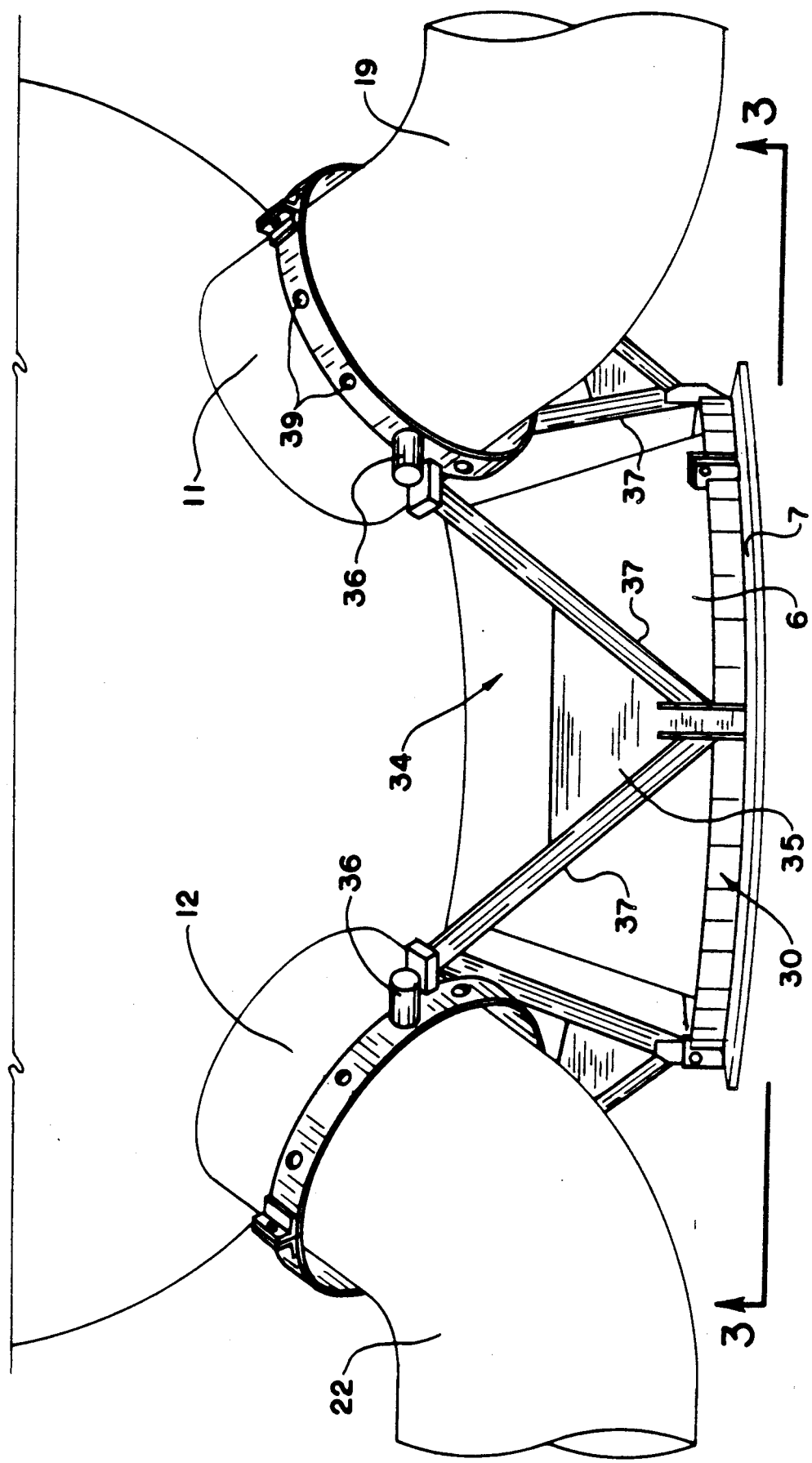
FIG. 2 is a partial front elevation of the channel head/lower assembly of an installed and operational steam generator showing the template of the present invention assembled in centered relationship around the support base and nozzles.
Figure 3:
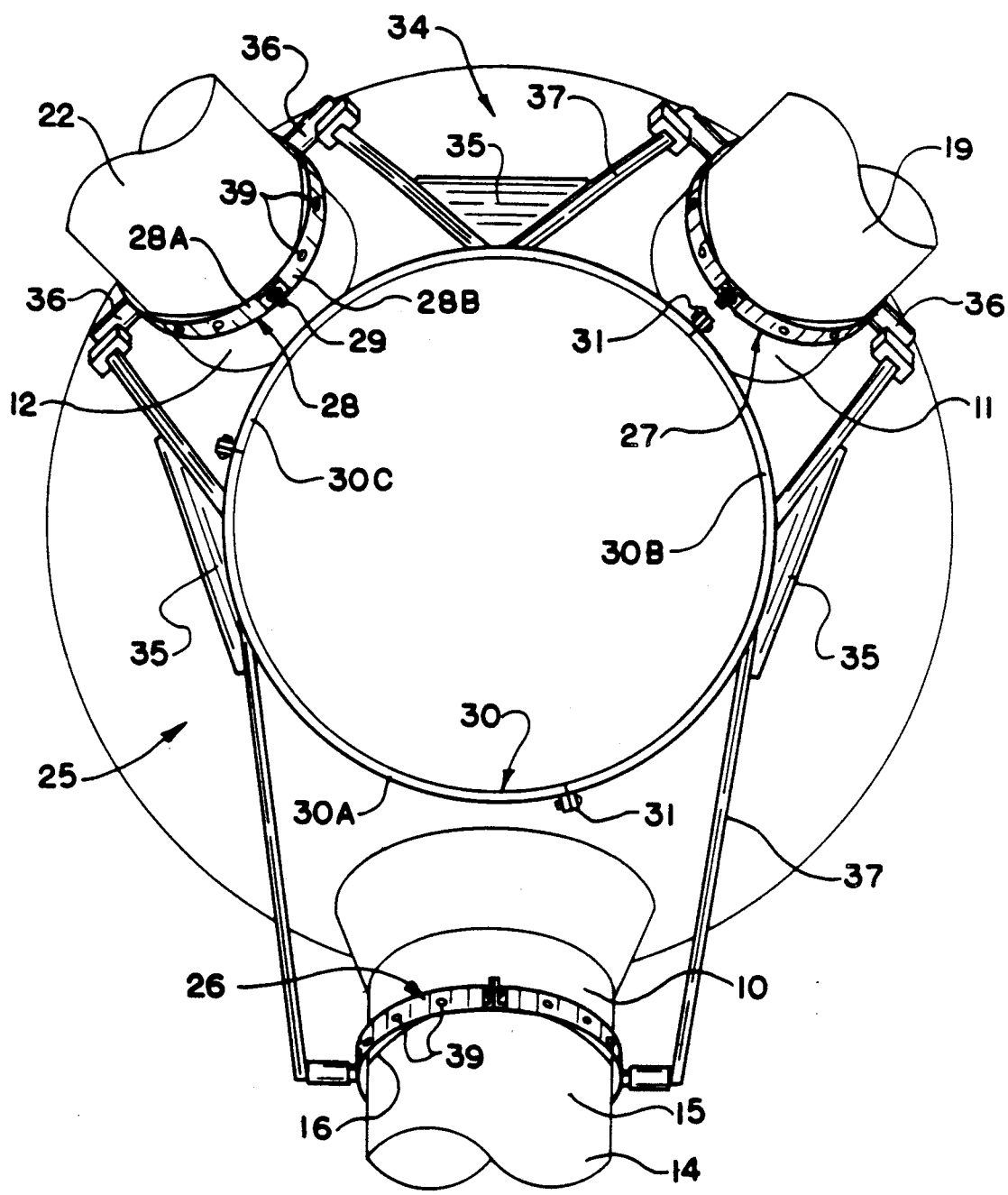
FIG. 3 is a bottom plan view taken generally along the plane 3-3 in FIG. 2 showing the three pipe connection measurement rings and base structure in assembled centered positions on the steam generator in its operational mode.

Turning now to FIGS. 2 and 3, the template, indicated generally at 25, includes three segmented pipe connection measurement rings indicated generally at 26, 27 and 28. Each of these pipe connection measurement rings 26–28 is formed by two half rings bolted together. For example, with respect to pipe connection measurement ring 28, half rings 28A and 28B have radially outwardly directed mating flanges 29 at their ends through which bolts are passed to secure the half rings together as composite ring 28. Each of the rings 26 through 28 has a slightly larger diameter than the pipe connection being measured.

To assemble each of the pipe connection measurement rings, the weld line at the junction of the nozzle and elbow is identified by a scribed line. The two half rings of each pipe connection measurement ring are individually assembled around their respective weld connections and are secured together by bolts extending through the mating flanges. Each ring is then centered relative to the pipe and nozzle contained therewithin, and the identified weld center line is centered relative to the width of the ring. Each ring is then temporarily held in such centered position by wedges or the like until the template is completed.

To this end, a vessel registry or base structure is also centered on the base support 6 of steam generator 1. The vessel registry structure, indicated generally at 30, includes as many segments as there are nozzles, in this case, three segments, identified respectively as 30A, 30B and 30C. Each of these vessel registry structure segments has a circumferential extent of 120° and includes radially outwardly turned flanges 31 at its respective ends mating with the flanges on the next adjacent segments. These three segments 30A–30C are joined together by bolts in a vessel registry structure assembly about the bottom of the base support 6 of steam generator 1 above the connection flange 7. The composite segmented vessel registry structure 30 is centered relative to the base support 6 with its bottom edge resting against the upper surface of flange 7. The vessel registry structure is temporarily held in its centered position by wedges or the like. The centered pipe connection measurement rings and vessel registry base structure are then rigidly secured together and held in place by a framework, indicated generally at 34.

This framework includes three base support web assemblies 35 individually welded to the three respective vessel registry structure segments intermediate their respective connection flanges 31. The framework further includes radially outwardly extending lugs 36 on each half ring of the segmented pipe connection measurement rings 26–28. These lugs on the half rings are positioned intermediate the flanges thereof and are diametrically opposed to one another on the completed pipe connection measurement rings. Rigid support struts 37 extend between and are welded to the vessel registry structure and base webs 35 at one end and the outwardly extending lugs 36 at the opposite end. When each of the lugs on each of the pipe connection measurement rings has been rigidly connected to the vessel registry base structure by a rigid strut 37, the template is complete.

Although welding the framework to the rings and base structure about the existing installation in the containment chamber is most suitable for the preferred nuclear energy plant environment because of the size thereof, it will be appreciated that the present invention also contemplates a permanent adjustable framework extending between the vessel registry base structure and the respective pipe connection measurement rings. In such case, the framework would have adjustable universal pivotal connections at the vessel registry base structure and pipe connection measurement rings. These pivotal connections could be clamped in place when each of the rings has been centered in the selected measurement position. In addition, while the base structure 30 is illustrated as a segmented ring, it will be appreciated that other configurations could be used to obtain vessel registry with the base support being used.

For such measurement, the pipe connection measurement rings are provided with a plurality of circumferentially spaced holes 39. A micrometer is placed through each of the holes 39 around each pipe connection measurement ring to obtain and record a series of measurements of the distance between the pipe connection weld and the pipe measurement ring extending therearound. Similar measurements are taken and recorded for the base support 6 relative to the vessel registry structure 30. The measurements for the vessel registry structure can be made by vernier caliper or, if desired, by a micrometer passed through circumferentially spaced holes (not shown).

When the measurements have been completed for each of the rings and base structure, the template 25 is disassembled from the steam generator 1 and associated primary system piping. For this purpose, the fasteners are removed joining the mating flanges on each of the pipe connection measurement rings and on the three segments of the vessel registry base structure. The respective mating flanges are match marked with corresponding numbers or indications prior to disassembly to make sure that the template is properly reassembled.

With the fasteners removed, the template is in three integral sections which may be readily removed from the containment chamber 2. These three template sections are then reassembled on the new channel head/lower assembly of the new steam generator 1A to make comparative measurements.

Figure 5:
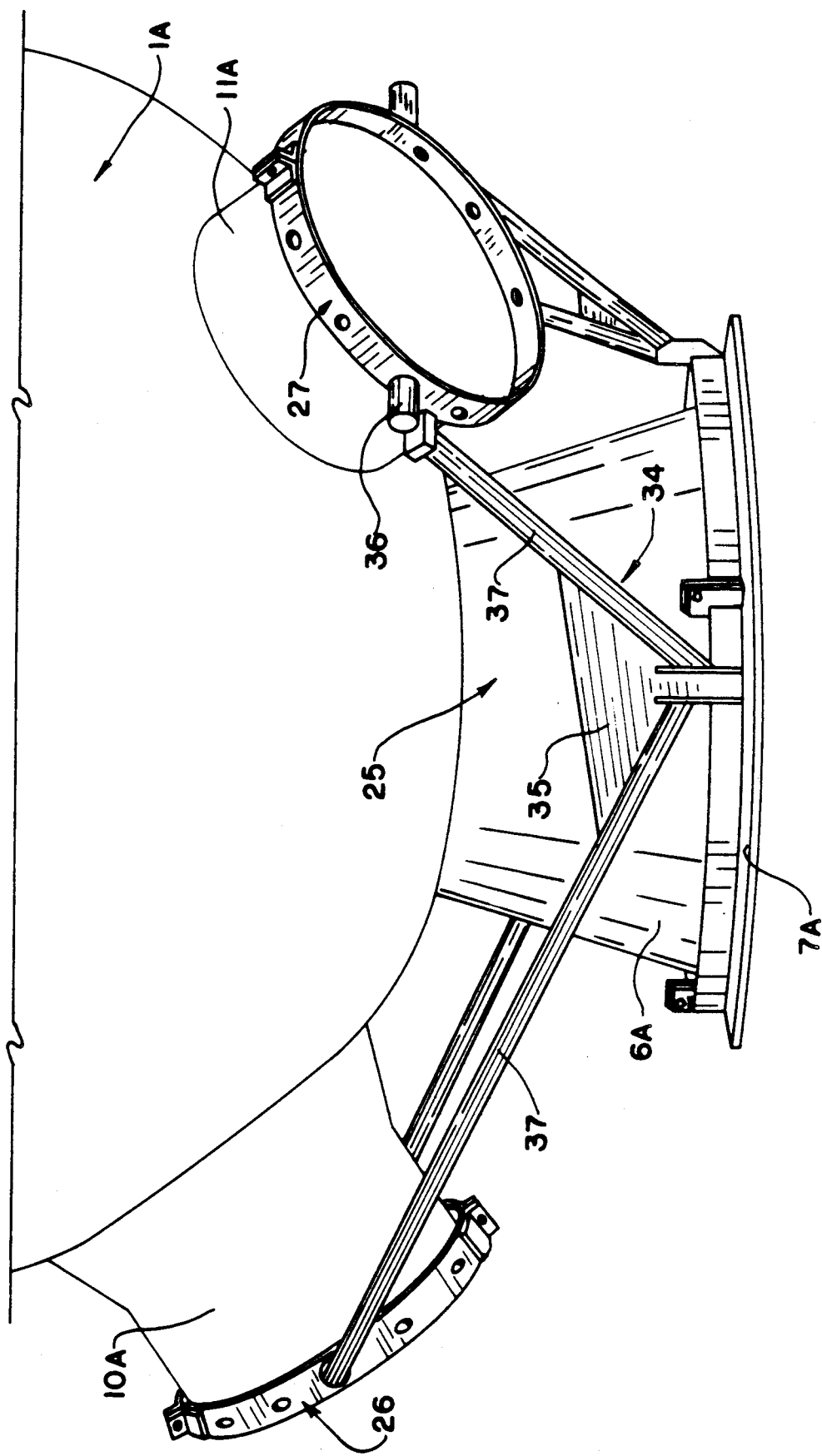
FIG. 5 is a side elevation of the channel head/lower assembly of the new steam generator with the template centered and assembled thereon to allow measurements to be made of the relative positions of the nozzle ends thereof to the pipe connection measurement rings therearound to comparatively determine if alignment will exist.

To this end, as best shown in FIG. 5, the new steam generator 1A has only its base support 6A and flange 7A finish machined. The vessel registry structure 30 of the template 25 is centered on the finished machined base support and flange, with the respective pipe connection measurement means being positioned about the inlet and outlet nozzle ends. The relative position of each of these nozzle ends to the respective pipe connection measurement rings 26–28 can be measured by micrometers to determine their relative positions and to compare those positions to the measurements taken on the old steam generator nozzle connections. This comparison of measurement establishes the extent of nozzle reworking required, if any, in order to obtain alignment between the new nozzles and existing pipes.

To this end, the respective measurements from the old steam generator are used to establish the desired nozzle centerline and weld preparation surfaces. The inlet nozzle 10A and outlet nozzles 11A and 12A on the new steam generator 1A are then reworked and finish machined in a non-radioactive, remote environment to obtain projected alignment between the same and the hot and cold leg pipes in the containment chamber when the old steam generator has been removed. All the work on the new steam generator nozzles can be performed while the old steam generator is operational.

As a preliminary step to the removal process of the old steam generator, the hot and cold leg pipes of the primary system are dimensionally surveyed to establish their respective positions in the installation. Temporary support bracing is then installed on each of such pipes to hold and stabilize the same in position during and after the respective welds have been cut to disconnect the steam generator from the primary piping system. As shown in FIG. 1, each of the weld connections between the end of the respective elbows and the nozzles is cut as indicated at 41 in FIG. 1. With the present process, only one cut needs to be made on each pipe of the primary system.

Lifting hooks 42 are provided on the upper end of the steam generator 1. These lifting hooks are used with an overhead crane assembly to vertically lift the steam generator 1 from the containment chamber 2. When the steam generator has been removed, the positions of the pipe inlet hot leg and pipe outlet cold legs are again dimensionally surveyed to verify that they have remained in the same position during and after steam generator removal. The relative position of the ends of the hot and cold inlet and outlet pipes may be checked again by using the template prior to lowering the new steam generator into place.

Figure 4:
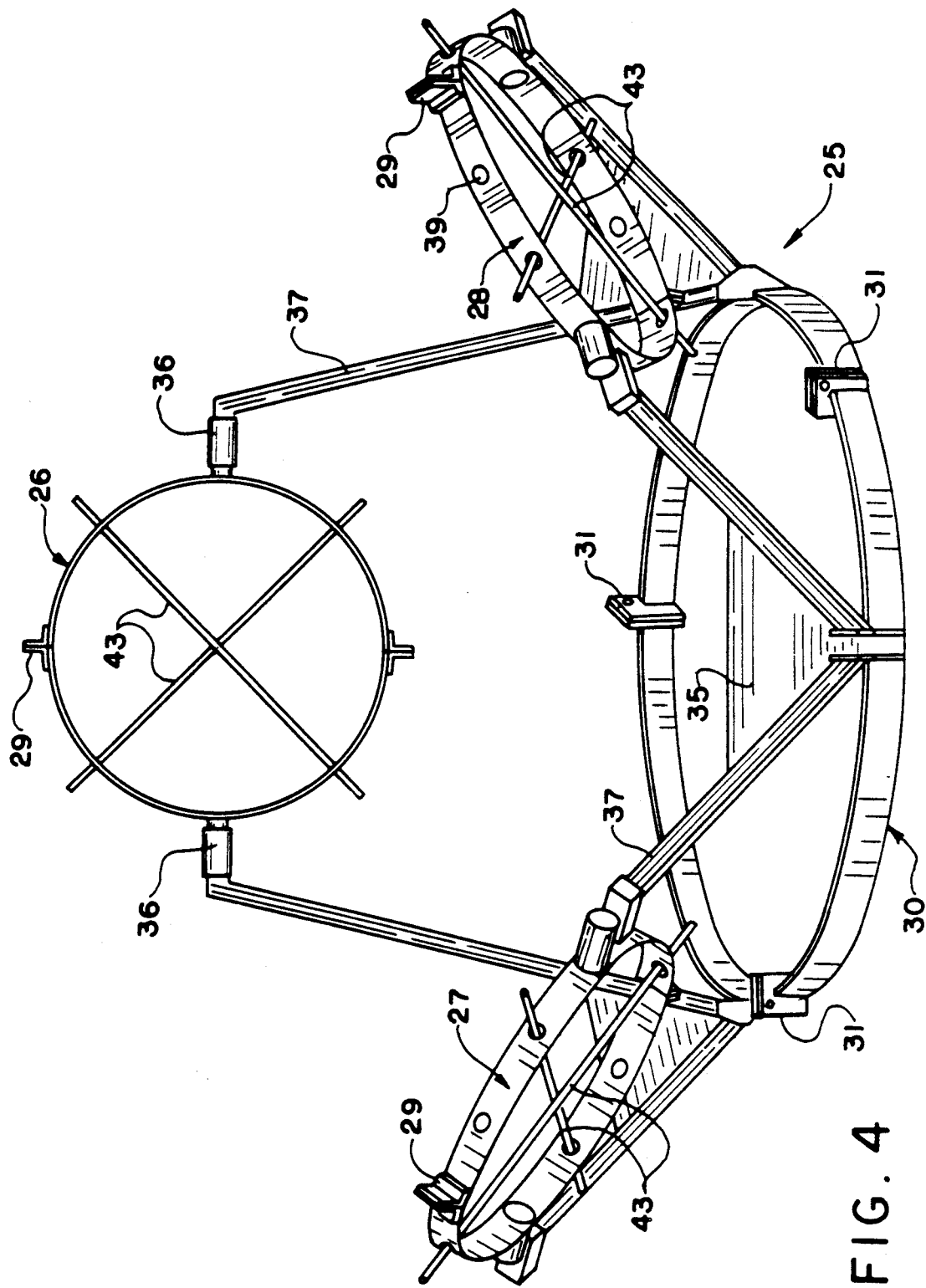
FIG. 4 is a perspective of the template with its sections joined together and with cross rods extending across each of the pipe connection measurement rings to establish the respective planes thereof.

For this purpose, as illustrated in FIG. 4, the template 25 has been removed from the new steam generator 1A and its sections reassembled. As shown, crossed rods 43 are passed through each pipe connection measurement ring 26–28 to establish the plane of each such ring. The assembled template 25 is then lowered into the containment chamber with the pipe connection measurement rings placed about the ends of each of the inlet and outlet legs of the primary system piping. The plane of each of the rings as established by the crossed rods is compared to the plane of each of the cut ends of the respective pipes to establish conformance of the matching planes within weld tolerances. In addition, the relative measurements of the ends of the new steam generator nozzles relative to the pipe connection measurement rings is compared to the measurements of the cut ends of the primary system pipes relative to the pipe connection measurement rings to verify alignment therebetween within weld tolerances. In the event that any misalignment or non conformance exists, minor reworking can be performed on the ends of the pipes and/or the steam generator nozzles to obtain alignment and plane conformance. By performing all or substantially all of the reworking and finish machining out of the containment chamber, the workers' exposure to radioactivity is reduced. In addition, by performing the reworking and finish machining on the nozzles of the new steam generator outside the radioactive environment, the plant may continue to operate until projected weld alignment has been obtained and until the next scheduled plant shut down in order to reduce the amount of down time for the plant.

The new steam generator is then lowered into the containment chamber with the respective inlet and outlet nozzles being respectively aligned with corresponding hot and cold leg cut piping. Welds are begun between each of the nozzles and the end of the elbows in alignment therewith. When sufficient weld rigidity has been obtained, the temporary bracing of the pipes is removed and the welds are then completed.

It will be apparent from the foregoing that changes may be made in the details of construction and configuration without departing from the spirit of the invention as defined in the following claims. For example, the template method disclosed herein may be used to replace any vessel of any size in an existing pipe system. In addition, although three connections have been illustrated and described, any number of one or more pipe connections can be made by providing a corresponding number of pipe connection measurement rings on the template. For example, a steam generator used in some nuclear plants has one hot inlet leg and one cold outlet leg. This generator could be replaced by utilizing a template having two pipe connection measurement rings and one base structure. Also, the method of steam generator support may vary from plant to plant. The template base structure can be modified to accomodate various support structure designs.

I claim:

1. A method of replacing an old vessel having at least one pipe connected thereto with a new vessel connected to the same pipe comprising the steps of:
   providing a template having vessel registry means, at least one pipe connection measurement means and a framework interconnecting the same;
   assembling the template on the old vessel and at least one pipe by positioning the vessel registry means in centered relationship on the old vessel at a specified location and by positioning the pipe connection measurement means in centered relationship substantially around the pipe connection to the old vessel;
   utilizing the framework to rigidly interconnect the vessel registry means to the pipe measurement means in their respectively centered positions;
   measuring the position of the vessel and pipe connection relative to the centered vessel registry means and pipe connection measurement means, respectively;
   removing the template from the old vessel and pipe;
   assembling the template on the new vessel by positioning the vessel registry means on the new vessel at the specified location in a centered location and by positioning the pipe connection measurement means adjacent to the intended point of pipe connection to the new vessel;
   comparing the measurements of the relative position of the pipe connection to the pipe connection measurement means as previously measured to the position of the intended connection of the pipe to the pipe connection measurement means on the new vessel to determine if acceptable alignment will exist therebetween;
   reworking the position of the intended connection on the new vessel, if necessary, to obtain proper alignment;
   disconnecting the pipe at its connection to the old vessel to permit the old vessel to be removed; and
   placing the new vessel in position to permit the pipe to be reconnected to the new vessel at its point of connection.

2. The method of claim 1 including the further steps of centering at least one segmented ring as the pipe connection measurement means around the vessel pipe connection centering a segmented base structure as the vessel registry means around the specified vessel location, temporarily holding the ring and base structure in their respective centered positions, and utilizing the framework to rigidly interconnect and hold the ring and base structure in their respective centered positions.

3. The method of claim 2 including the further steps of installing struts between the centered segmented ring and centered segmented base structure while temporarily held to create the rigidifying framework therebetween to form the template.

4. The method of claim 2 including the further steps of unjoining the segmented ring and base structure to remove the template in sections from the old vessel and pipe connection in the system and then rejoining the segmented ring and base structure, respectively, to join the sections of the template together on the new vessel.

5. The method of claim 1 including the further step of providing plural segmented rings for a like number of plural pipe connections on a steam generator in a primary system of a nuclear energy plant.

6. The method of claim 1 including the steps of surveying the position of the one pipe as connected to the old vessel, temporarily bracing the pipe to hold it in that position during disconnection from the old vessel and initial connection to the new vessel.

7. The method of claim 6 including the step of removing the template from the new vessel and repositioning the same on the disconnected pipe to reconfirm alignment within connection tolerances.

8. The method of claim 7 including the further step of establishing the plane of the connection on the new vessel and comparing that plane to the plane of the disconnected pipe end to confirm conformance between the planes within connection tolerances.

* * * * *